(12) United States Patent
Long

(10) Patent No.: US 11,447,998 B2
(45) Date of Patent: Sep. 20, 2022

(54) SOFT SELF-CLOSE DOOR DAMPER

(71) Applicant: SAFRAN CABIN INC., Huntington Beach, CA (US)

(72) Inventor: Eric Long, Huntington Beach, CA (US)

(73) Assignee: SAFRAN CABIN INC., Huntington Beach, CA (US)

( * ) Notice: Subject to any disclaimer, the term of this patent is extended or adjusted under 35 U.S.C. 154(b) by 19 days.

(21) Appl. No.: 16/341,031

(22) PCT Filed: Apr. 1, 2019

(86) PCT No.: PCT/US2019/025148
§ 371 (c)(1),
(2) Date: Apr. 10, 2019

(87) PCT Pub. No.: WO2019/195150
PCT Pub. Date: Oct. 10, 2019

(65) Prior Publication Data
US 2021/0355731 A1    Nov. 18, 2021

Related U.S. Application Data

(60) Provisional application No. 62/651,612, filed on Apr. 2, 2018.

(51) Int. Cl.
  *E05F 5/02*     (2006.01)
  *B64C 1/14*     (2006.01)
  *E05F 5/00*     (2017.01)

(52) U.S. Cl.
  CPC ............ *E05F 5/025* (2013.01); *B64C 1/1407* (2013.01); *E05F 5/003* (2013.01); *E05Y 2800/24* (2013.01); *E05Y 2900/502* (2013.01)

(58) Field of Classification Search
  CPC ...... E05F 5/025; E05F 5/003; E05Y 2800/24; E05Y 2900/502
  See application file for complete search history.

(56) References Cited

U.S. PATENT DOCUMENTS

| 8,272,166 B2 | 9/2012 | Nezu |
| 8,418,406 B2 * | 4/2013 | Zimmer .................... E05F 1/16 49/379 |

(Continued)

FOREIGN PATENT DOCUMENTS

| AU | 2016262687 A1 | 6/2017 |
| CN | 101649706 B | 2/2013 |

(Continued)

OTHER PUBLICATIONS

International Search Report and Written Opinion issued in PCT/US2019/025148.

(Continued)

*Primary Examiner* — Victor D Batson
*Assistant Examiner* — Matthew J Sullivan
(74) *Attorney, Agent, or Firm* — Jeffer Mangels; Butler & Mitchell LLP; Brennan C. Swain, Esq.

(57) ABSTRACT

A door damper assembly that includes a housing, a damper that includes a fixed end and a movable end disposed within the housing, a carriage assembly that is movable within the housing between a closed position and an open position, a claw assembly pivotably attached to the carriage assembly, and a spring positioned to bias the carriage assembly to the closed position. The movable end of the damper is secured to the carriage assembly. The claw assembly is movable with the carriage assembly between the closed position and the open position. The claw assembly is movable relative to the carriage assembly between a non-toggle position and a toggle position. The claw assembly includes a pin receiving space defined therein that defines a claw axis that is generally vertical when the claw is in the non-toggle position and not vertical when the claw assembly is in the toggle position.

15 Claims, 9 Drawing Sheets

(56) References Cited

U.S. PATENT DOCUMENTS

| | | | |
|---|---|---|---|
| 8,746,422 B2 | 6/2014 | Zimmer | |
| 8,899,703 B2* | 12/2014 | Chung | A47B 88/463 312/333 |
| 9,388,622 B1* | 7/2016 | Paron | E05F 15/56 |
| 9,435,152 B2* | 9/2016 | Zimmer | E05F 1/16 |
| 9,708,844 B2* | 7/2017 | Glogowski | E05F 3/18 |
| 9,879,459 B2* | 1/2018 | Zimmer | F16C 29/002 |
| 9,945,167 B2* | 4/2018 | Svara | E05F 5/003 |
| 2011/0041284 A1* | 2/2011 | Kimura | E05F 5/003 16/49 |
| 2013/0061425 A1* | 3/2013 | Inaguchi | F16F 9/3228 16/85 |
| 2013/0104339 A1* | 5/2013 | Shimizu | A47B 88/467 16/72 |
| 2013/0182978 A1* | 7/2013 | Huang | A47B 88/467 384/21 |
| 2014/0026357 A1* | 1/2014 | Zimmer | E05F 1/16 16/72 |
| 2014/0109343 A1* | 4/2014 | Chang | E05F 5/003 16/49 |
| 2015/0026928 A1* | 1/2015 | Haab | E05F 1/16 16/96 R |
| 2016/0333622 A1* | 11/2016 | Glogowski | E05F 5/003 |
| 2016/0340917 A1* | 11/2016 | Zimmer | E04F 21/0007 |
| 2016/0340955 A1* | 11/2016 | Zimmer | E05F 5/003 |
| 2016/0369548 A1* | 12/2016 | Dodge | E05F 1/16 |
| 2017/0051813 A1* | 2/2017 | Karu | F16H 21/44 |
| 2017/0130501 A1* | 5/2017 | Svara | E05F 5/003 |
| 2017/0265644 A1 | 9/2017 | Fischer | |
| 2018/0216386 A1* | 8/2018 | Demir | B60J 5/06 |
| 2018/0249833 A1* | 9/2018 | Goetz | A47B 88/49 |
| 2019/0090636 A1* | 3/2019 | Rehage | F24C 15/168 |
| 2019/0239644 A1* | 8/2019 | Pohlmann | A47B 88/467 |
| 2019/0330904 A1* | 10/2019 | Svara | E05F 3/22 |
| 2020/0190882 A1* | 6/2020 | Bantle | A47B 88/473 |
| 2021/0010309 A1* | 1/2021 | Montecchio | E05F 5/003 |

FOREIGN PATENT DOCUMENTS

| | | |
|---|---|---|
| EP | 2873345 A1 | 5/2015 |
| GB | 2544256 A | 5/2017 |
| GB | 2551712 A | 1/2018 |
| JP | 2006-063767 A | 9/2006 |
| JP | 2008-163704 A | 7/2008 |
| JP | 2011226188 A | 11/2011 |
| JP | 2012-205717 A | 10/2012 |
| WO | 2013047518 A1 | 4/2013 |
| WO | 2013138886 A1 | 9/2013 |
| WO | 2015193509 A1 | 12/2015 |

OTHER PUBLICATIONS

Office Action issued in related Japanese Appln. 2021-503698 dated Dec. 7, 2021.
Extended European Search Report issued in European Application 19780709.2.

* cited by examiner

SOFT SELF-CLOSE DOOR DAMPER

CROSS REFERENCE TO RELATED APPLICATIONS

This application is a national stage application, filed under 35 U.S.C. § 371, of International Patent Application No. PCT/US19/25148 filed Apr. 1, 2019, which claims the benefit of U.S. Provisional Application No. 62/651,612 filed Apr. 2, 2018, the entireties of which are incorporated herein by reference.

FIELD OF THE INVENTION

The present invention relates generally to door damper, and more particularly to a door damper that includes a self-closing function.

BACKGROUND OF THE INVENTION

When not in use, doors in lavatories on aircraft often are left slightly open and thereby protrude into the narrow aisle. A need exists for a lavatory door that includes a self-closing feature.

SUMMARY OF THE PREFERRED EMBODIMENTS

In accordance with a first aspect of the present invention there is provided a door damper assembly that includes a housing, a damper that includes a fixed end and a movable end disposed within the housing, a carriage assembly that is movable within the housing between a closed position and an open position, a claw assembly pivotably attached to the carriage assembly, and a spring positioned to bias the carriage assembly to the closed position. The movable end of the damper is secured to the carriage assembly. The claw assembly is movable with the carriage assembly between the closed position and the open position. The claw assembly is movable relative to the carriage assembly between a non-toggle position and a toggle position. The claw assembly includes a pin receiving space defined therein that defines a claw axis that is generally vertical when the claw is in the non-toggle position and not vertical when the claw assembly is in the toggle position. In a preferred embodiment, the carriage assembly and the claw assembly move along a carriage path having a first end and a second end as the carriage assembly moves between the closed position and the open position and the claw assembly pivots to the toggle position at the second end of the carriage path.

In a preferred embodiment, the spring has a first end secured to the housing and a second end secured to the carriage assembly. Preferably, the carriage assembly defines a spring receiving space therein and the spring is disposed in the spring receiving space. In a preferred embodiment, the carriage assembly includes a spring protrusion protruding therefrom that is received in a spring slot defined in the housing. The spring protrusion is positioned proximate the spring and moves along the spring slot when the carriage assembly moves between the closed position and the open position.

In a preferred embodiment, the claw assembly is pivotably attached to the carriage assembly by a claw pivot pin that is at least partially disposed in a carriage assembly protrusion that protrudes from the carriage assembly. Preferably, the claw pivot pin and carriage assembly protrusion are co-axial. However, in another embodiment, they are not co-axial. The carriage assembly protrusion is received in a carriage assembly slot defined in the housing. The carriage assembly protrusion moves along the carriage assembly slot when the carriage assembly moves between the closed position and the open position. In a preferred embodiment, the claw assembly includes a claw assembly protrusion protruding outwardly therefrom that is received in a claw assembly slot defined in the housing. The claw assembly slot includes a first portion and a second portion. The first portion of the claw assembly slot is straight and the second portion of the claw assembly slot is curved. The claw assembly protrusion moves along the claw assembly slot when the carriage assembly moves between the closed position and the open position. The claw assembly moves to the toggle position when the claw assembly protrusion moves through the second portion of the claw assembly slot.

In a preferred embodiment, the claw assembly includes first and second claw members and the second claw member is pivotable with respect to the first claw member. Preferably, the second claw member is pivotable between a first position and a second position and is biased to the first position. In a preferred embodiment, when the carriage assembly moves between the closed position and the open position the pin receiving space defines a pin path. The second claw member includes an outer inclined surface and is configured such that when a pin moving along the pin path from an open position to a closed position contacts the outer inclined surface, the second claw member pivots from the first position to the second position. Preferably, the second claw member is pivotably attached to the first claw by a reset pivot pin that is at least partially disposed in the claw assembly protrusion that protrudes from the second claw member. The reset pivot pin and claw assembly protrusion are co-axial and the claw assembly protrusion is received in a claw assembly slot defined in the housing. Preferably, a claw spring extends between the carriage assembly and the second claw member and biases the second claw member to the first position. In a preferred embodiment, the claw assembly extends downwardly through an opening in the housing such that at least a portion of the pin receiving space is located at an exterior of the housing.

The present invention is a door damping device or assembly. In a preferred embodiment, the door damping assembly is used to damp the door in an aircraft lavatory as it closes. However, this is not a limitation on the present invention, and the description herein of the door damping assembly being used in an aircraft is only exemplary. In particular, in a preferred embodiment, the door damping assembly is used with the lavatory door taught in U.S. Pat. No. 9,428,259, issued on Aug. 30, 2016, the entirety of which is incorporated by reference herein. The door damping assembly can be used with a bi-fold or a blade door.

The door damper assembly of the present invention generally includes a housing having a front cover and a claw that receive a roller pin that extends upwardly from a bi-fold door. The door damper assembly also includes a carriage, a damper, a spring and the claw. In use, the roller pin is received in the claw.

When the door is opened, the pin. claw and carriage move to the open position. As the carriage and claw get to the opened position, a track or slot that has an upturned or curved end causes the claw to toggle, open or move to an angle and release the door roller pin, which continues moving with the door to the door's open position. This is referred to herein as the claw going into toggle and releasing the pin. The spring is also extended in this position. The spring is stretched and biases the carriage such that it wants to pull the carriage back to the home or closed position, but, because the claw is in toggle the spring cannot pull it back. One end of the spring is attached to the carriage and the other end is attached in a notch within the housing.

When the door is moved toward the closed position, the claw receives the door roller pin (the pin contacts one of the arms or heads of the claw) and pushes the claw to release the claw from toggle. The spring then pulls the carriage back toward the closed position (pulling the door closed). At the same time, the damper extends and dampens the closing motion.

In a preferred embodiment, the door damping assembly includes a spring loaded reset in case the pin is not received in the claw properly. In a reset situation where the pin is not in the claw, as the pin moves to the home position, it contacts one of the arms or heads of the claw that is pivotable such that it retracts, pivots and moves out of the way to allow the pin to pass thereby and move to the home position inside the claw. As the pin moves past the pivotable claw arm a spring biases or moves the head back to the normal position and the pin is recaptured within the claw.

The present invention can be used in scenarios other than an aircraft. For example the invention can be used in other enclosures that include a bi-fold door.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
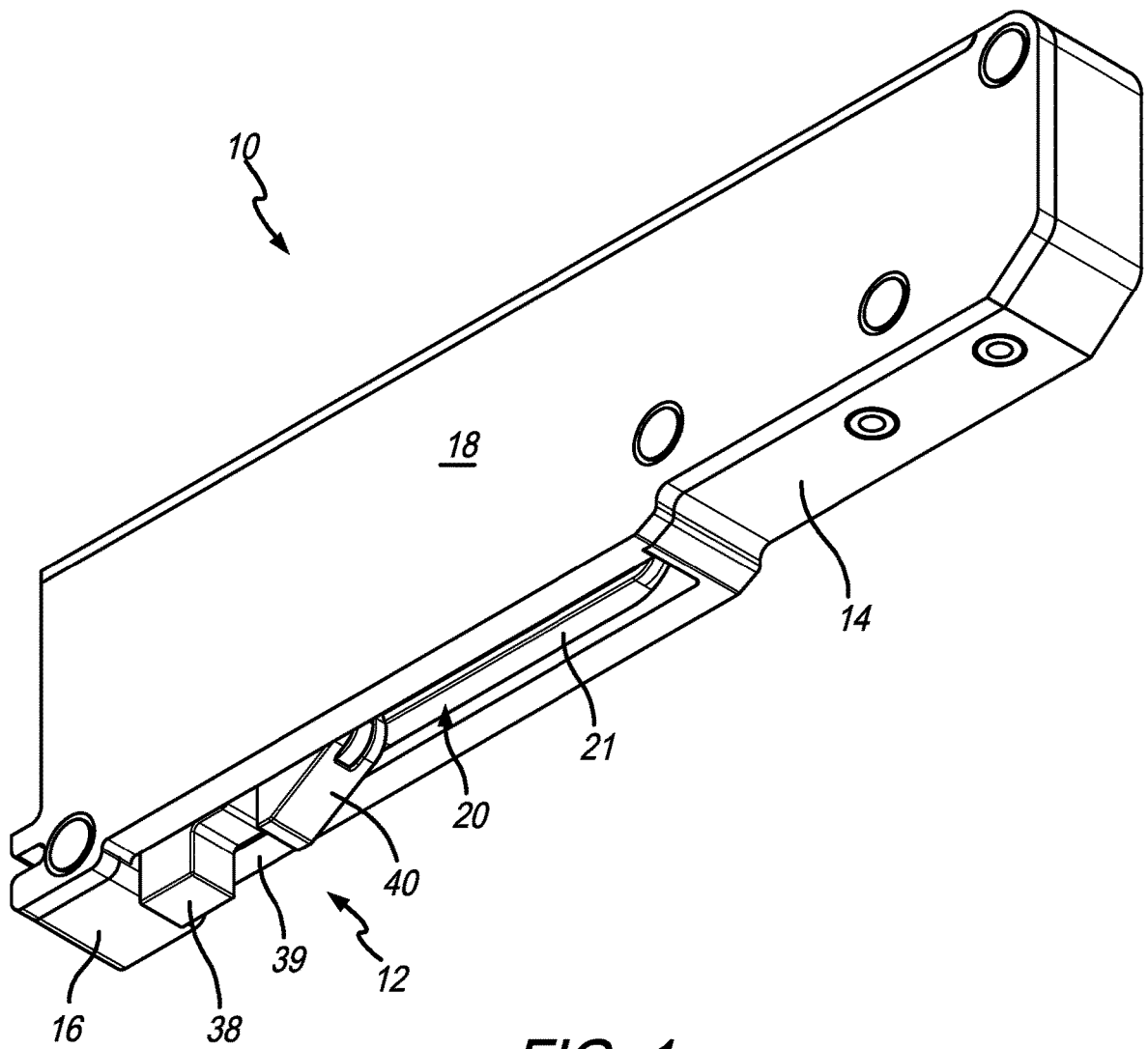
FIG. 1 is a perspective view of a door damper assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 2:
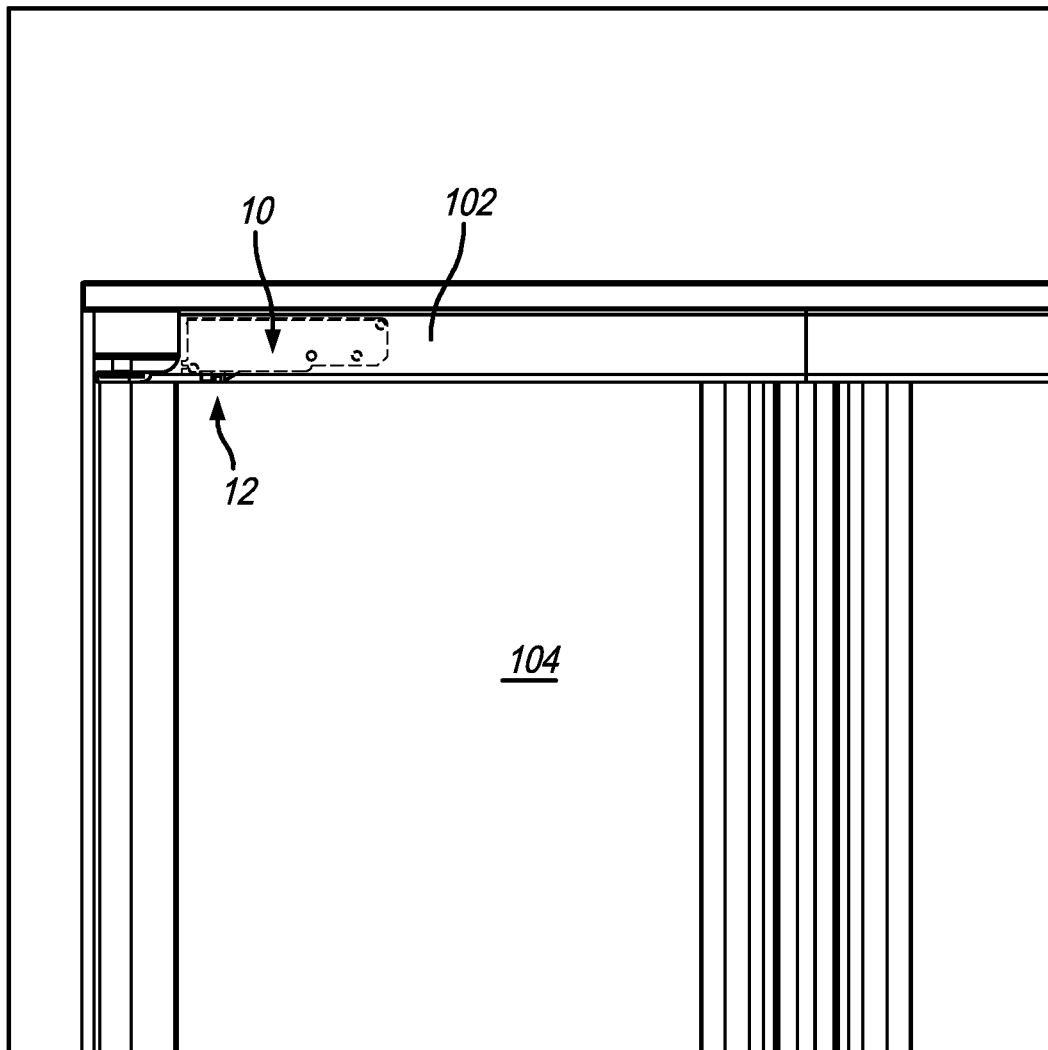
FIG. 2 is a view of a door with the door damper assembly in the door header.

FIGS. 1-13 show a door damper assembly 10 in accordance with a preferred embodiment of the present invention. As shown in FIG. 2, in a preferred embodiment, the door damper assembly 10 is mounted in the header 102 above a lavatory bi-fold door 104. A roller pin 100 extends upwardly from the door 104 and is received in a claw assembly 12, as described below. The type of pin or other protrusion from the door is not a limitation on the present invention. Any roller, pin, protrusion, shaft, rod, etc. is within the scope of the present invention and is considered a pin for purposes of the claims. In another embodiment, the door damper assembly can be positioned at the bottom of the door.

Figure 3:
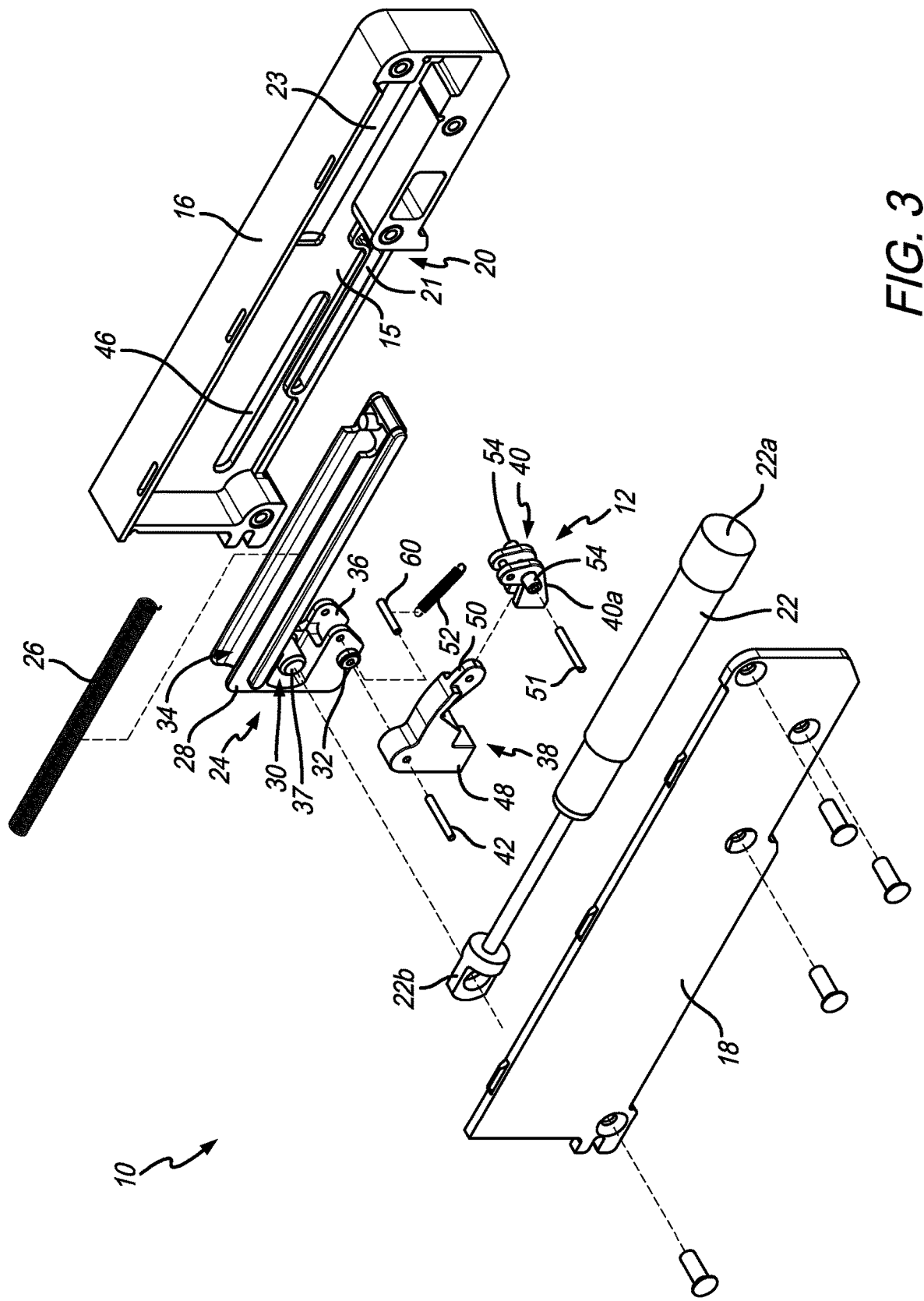
FIG. 3 is a front perspective exploded view of the door damper assembly.
Figure 4:
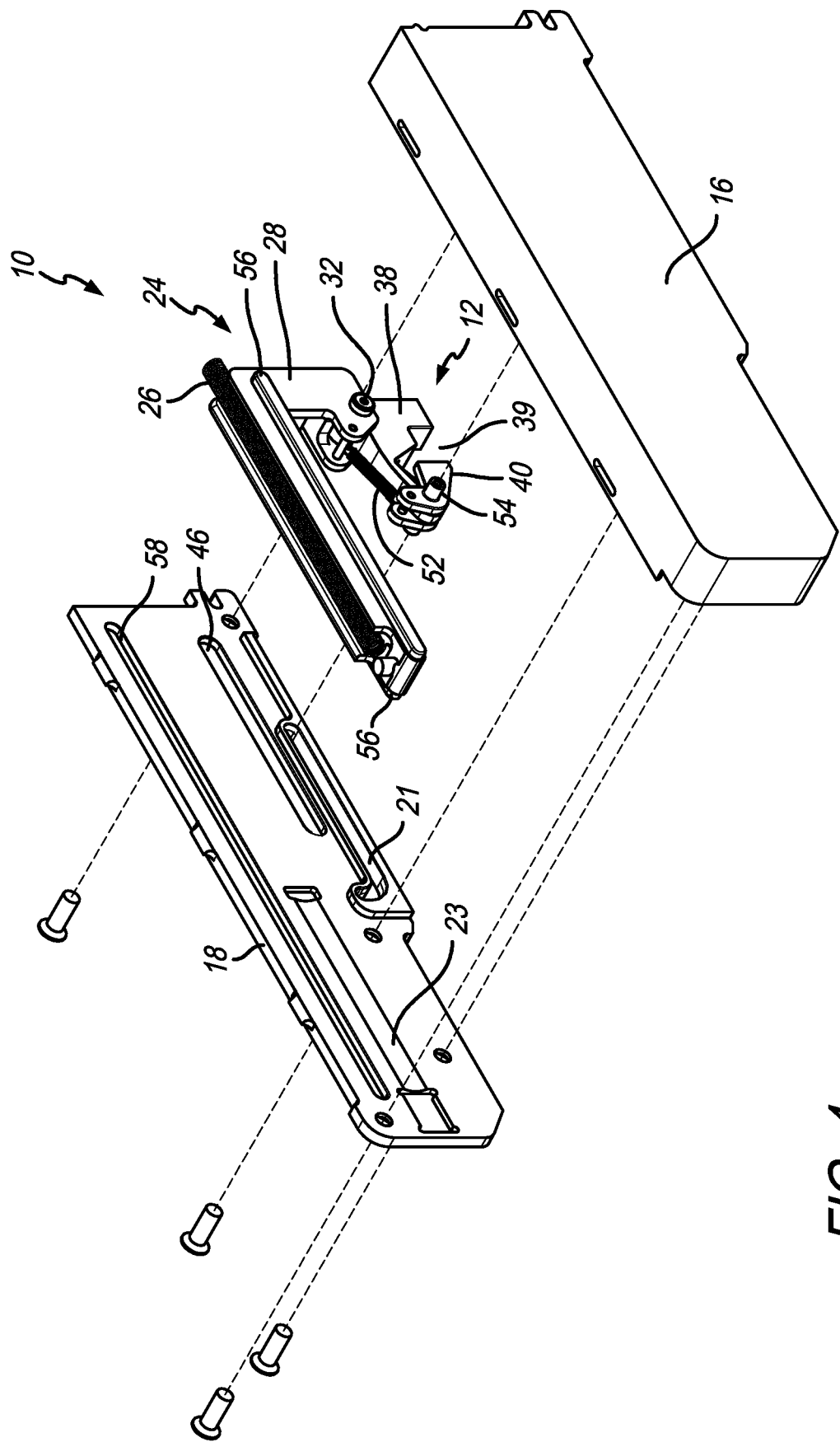
FIG. 4 is a rear perspective exploded view of the door damper assembly.

With reference to FIGS. 3-4, generally, the door damper assembly 10 includes a housing 14 that has a housing interior 15, main body portion 16, cover 18, a door pin slot 20 (defined in the housing 14), claw assembly slot 21, a damper 22, carriage assembly 24, the claw assembly 12 and a spring 26. The carriage assembly 24 includes the carriage member 28, a damper recess 30, carriage assembly protrusion 32, a spring receiving space 34 and a claw space 36 that is defined in the carriage member 28. The damper 22 includes a fixed end 22a and a movable end 22b, which is secured to the carriage member 28 and received in the damper recess 30. In a preferred embodiment, the movable end 22b includes an opening therethrough that receives a damper protrusion 37 therein. As shown in FIG. 1, the claw assembly 12 extends through the door pin slot 20 and to the exterior of the housing 14. The housing 14 can also include damper recesses 23 defined therein for receiving a part of the damper 22. The cover 18 can be secured to the main body portion 16 via threaded fasteners, rivets, welding, adhesive or other known attachment method.

The claw assembly 12 includes first and second claw members 38 and 40 whose inside surfaces define a pin receiving space 39 therebetween. The claw assembly 12 is pivotably connected to the carriage member 28. In a preferred embodiment, it is the first claw member 38 that is pivotably connected to the carriage member 28 and is pivotable within the claw space 36. In a preferred embodiment, the first claw member 38 is secured within the claw space 36 by a claw pivot pin 42. In a preferred embodiment, the carriage member 28 includes outwardly extending carriage assembly protrusions 32 that mate with elongated carriage assembly slots 46 in the housing 14 (i.e., the main body portion 16 and the cover 18). The claw pivot pin 42 is co-axial with the carriage assembly protrusions 32.

Figure 5:
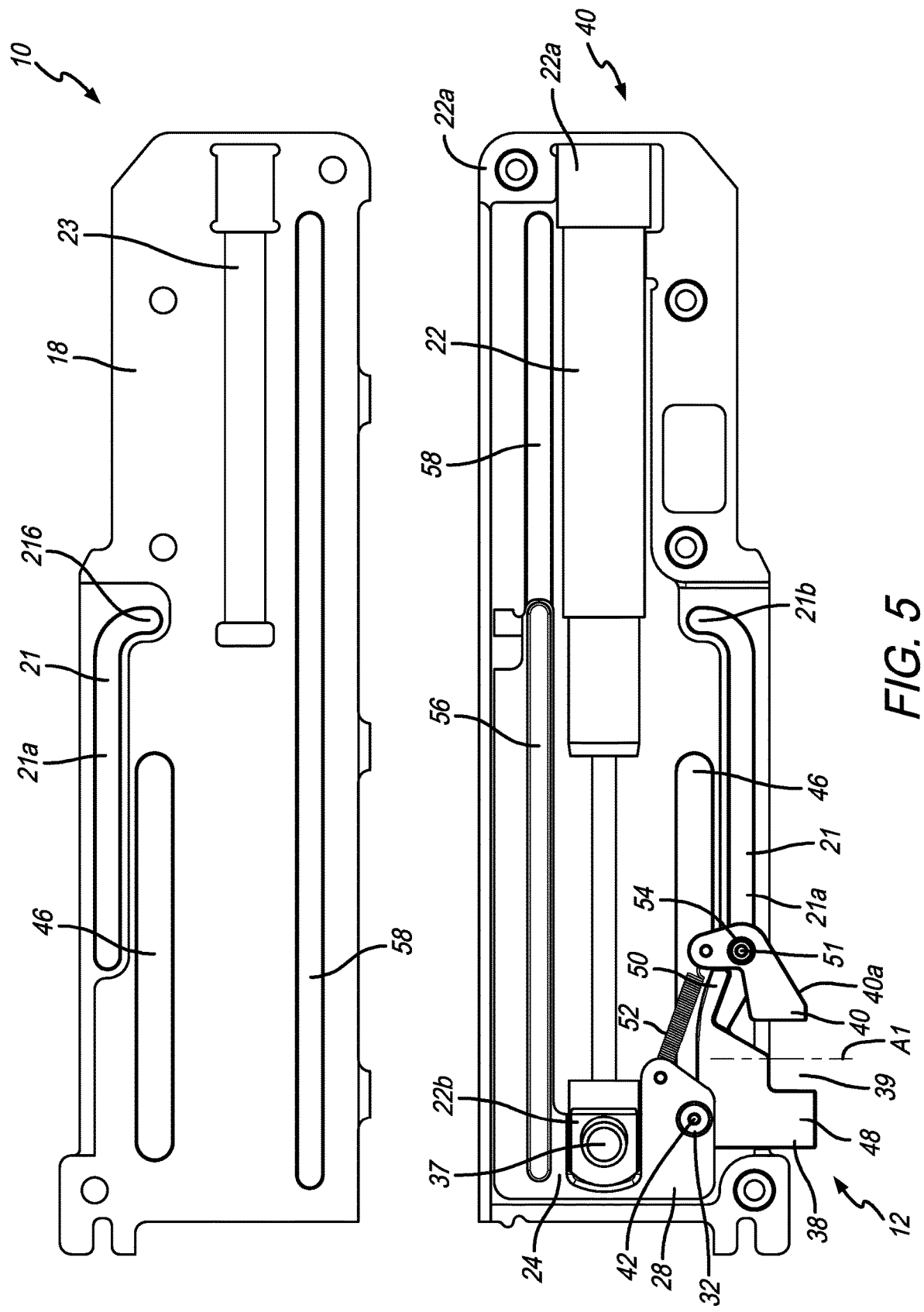
FIG. 5 is a front elevational view of the door damper assembly with the cover removed (the cover is shown upside down)

The first claw member 38 includes a pin abutment portion 48 and a beak portion 50. In a preferred embodiment, the claw assembly includes a reset feature. With this feature, the second claw member 40 is preferably pivotably secured to and pivotable with respect to the first claw member 38. As shown in FIG. 5, in a preferred embodiment, the second claw member 40 is pivotably secured to the beak portion 50 of the first claw member 38 by a reset pivot pin 51 and is movable between a first position and a second position, as described below. In a preferred embodiment with the reset feature, a claw spring 52 extends between the carriage assembly 24 (e.g., the carriage member 28) and the second claw member 40. The claw spring 52 biases the second claw member to the first position (see FIG. 5). As shown in FIG. 3, the claw spring 52 is secured to the carriage member 28 by an axle 60. The claw assembly 12 also includes claw assembly protrusions 54 that are received in and travel along the claw assembly slots 21. In a preferred embodiment, the reset pivot pin 51 is co-axial with the claw assembly protrusions 54.

Figure 6:
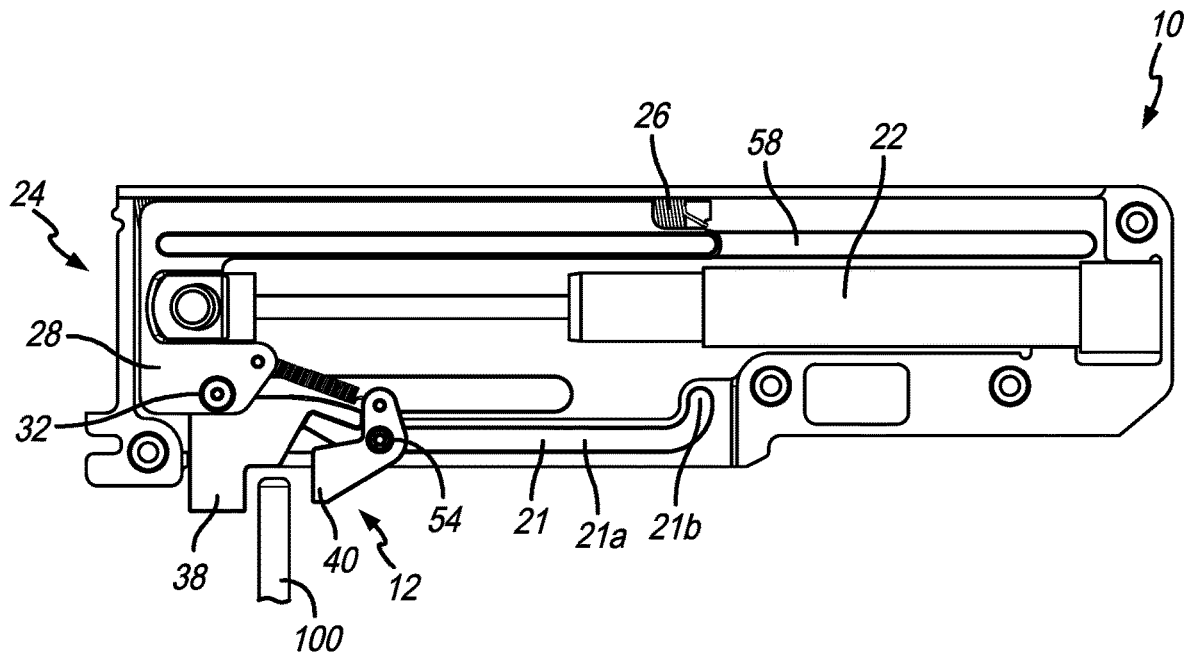
FIG. 6 is a front elevational view of the door damper assembly showing the carriage assembly in the closed position and the claw assembly in the non-toggle position and with the door pin in the pin receiving space.
Figure 7:
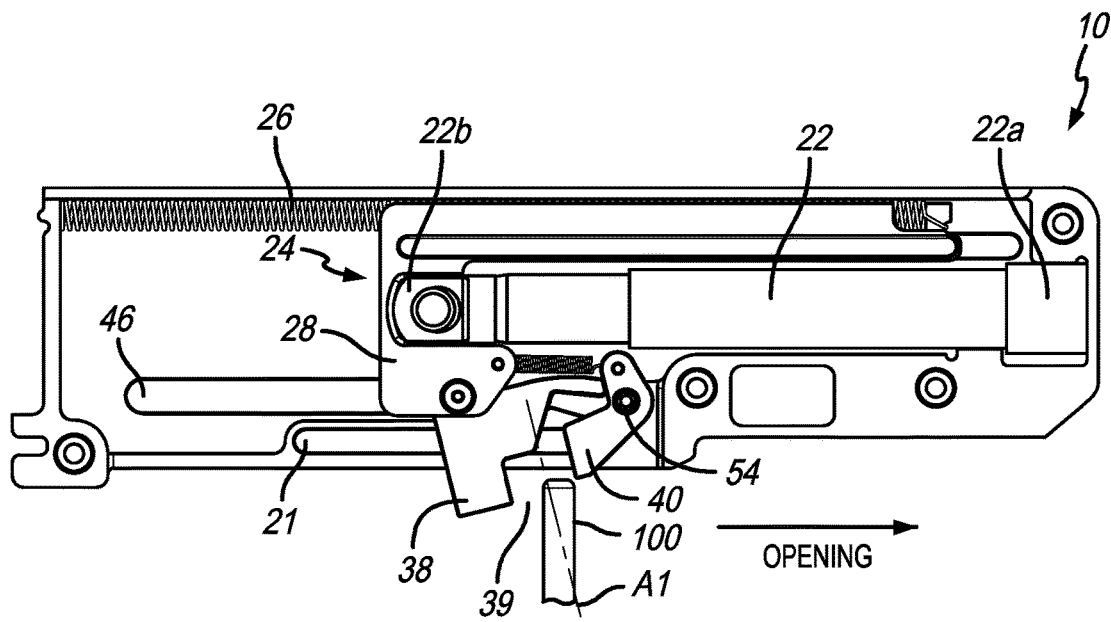
FIG. 7 is a front elevational view of the door damper assembly showing the carriage assembly in the open position and the claw assembly in the toggle position and with the door pin in the pin receiving space.

As discussed herein, the claw assembly 12 is pivotably attached to the carriage assembly 24 and is movable with the carriage assembly between the closed position (FIG. 6) and the open position (FIG. 7). The claw assembly 12 is also movable relative to the carriage assembly between a non-toggle position (FIG. 6) and a toggle position (FIG. 7). As shown in FIG. 5, the first and second claw members 38 and 40 and the pin receiving space 39 define a claw axis A1 that is generally vertical when the claw assembly 12 is in the non-toggle position. As shown in FIG. 7, the claw axis is not vertical and defines an acute angle with a vertical axis when the claw assembly 12 is in the toggle position.

The spring 26 preferably is attached at one end to the housing 14 and at the other end to the carriage member 28. The spring 26 is housed in the spring receiving space 34. The spring receiving space can be any shape. In a preferred embodiment, it is a channel that is positioned on the top of the carriage member 28, as shown in FIG. 4. As discussed below, the spring 26 stretches as the carriage assembly 24 moves to the open position and biases the carriage assembly 24 and claw assembly 12 to the closed position.

It will be appreciated that the carriage assembly 24 and the claw assembly 12 move along a carriage path having a first end and a second end as the carriage assembly moves between the closed position and the open position and the claw assembly pivots to the toggle position at the second end of the carriage path. FIG. 6 shows the carriage assembly 24 and claw assembly 12 at the first end of the carriage path and FIG. 7 shows the carriage assembly 24 and claw assembly 12 at the second end of the carriage path. Also, the carriage assembly 12 includes spring protrusions 56 protruding therefrom (protruding from the carriage member 28 in the preferred embodiment, as shown in FIG. 4). The spring protrusions 56 are received in spring slots 58 defined in the housing. The spring protrusions 56 are positioned proximate or near the spring and move along the spring slots 58 when the carriage assembly 24 moves between the closed position and the open position.

FIGS. 6-10 show the door damper assembly in operation. FIG. 6 shows the carriage assembly 24 in the closed position and the claw assembly 12 in the non-toggle position and with the roller pin 100 in the pin receiving space 39. This is the home position of the components of the assembly when the door 104 is in the closed position. As the door 104 is opened, the roller pin 100 contacts the inside surface of the second claw member 40 and pushes the claw assembly 12 and carriage assembly 24 toward the open position. At the same time, the spring 26 stretches and the damper 22 compresses. The claw assembly slot 21 includes a first portion 21a that is straight and a second portion 21b that curves upwardly. As the carriage assembly 24 moves toward the open position, the claw assembly protrusion 54 travels along and moves within the first portion 21a of the claw assembly slot 21.

Figure 8:
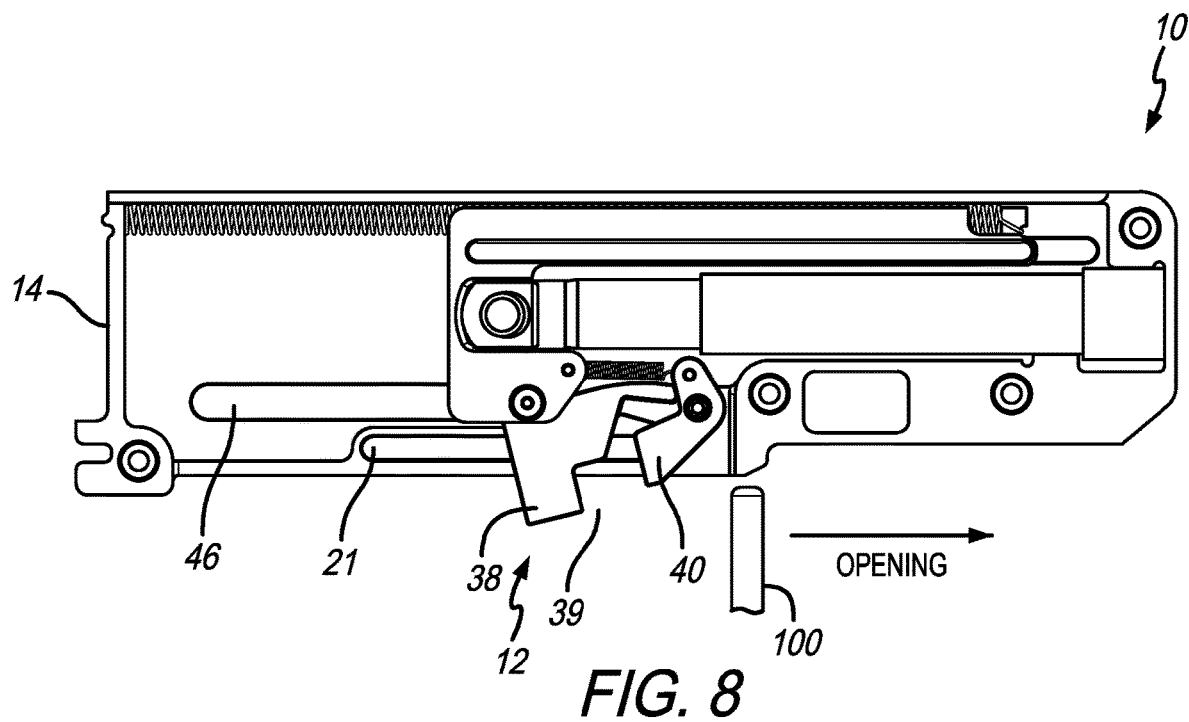
FIG. 8 is a front elevational view of the door damper assembly showing the carriage assembly in the open position and the claw assembly in the toggle position and the door pin after traveling outside of the pin receiving space while the door is still opening.

As shown in FIG. 7, when the claw assembly 12 reaches the second portion 21b of the claw assembly slot 21, because it has an upwardly curved shape, the claw assembly 12 pivots to the toggle position. As a result of this movement, the second claw member 40 pivots upwardly enough that the roller pin 100 clears the bottom surface of the second claw member 40. As shown in FIG. 8, after the roller pin 100 has cleared the second claw member 40 and exited the pin receiving space 39, the door and the roller pin 100 continue to move to the fully open position of the door.

Figure 9:
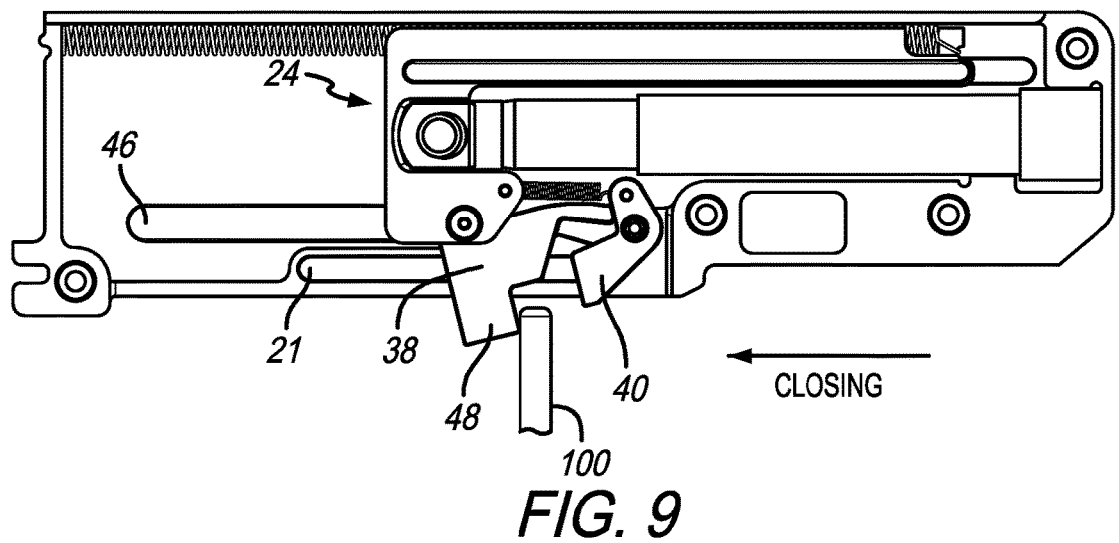
FIG. 9 is a front elevational view of the door damper assembly showing the carriage assembly in the open position and the claw assembly in the toggle position and the door pin being received back in the pin receiving space and while the door is closing.
Figure 10:
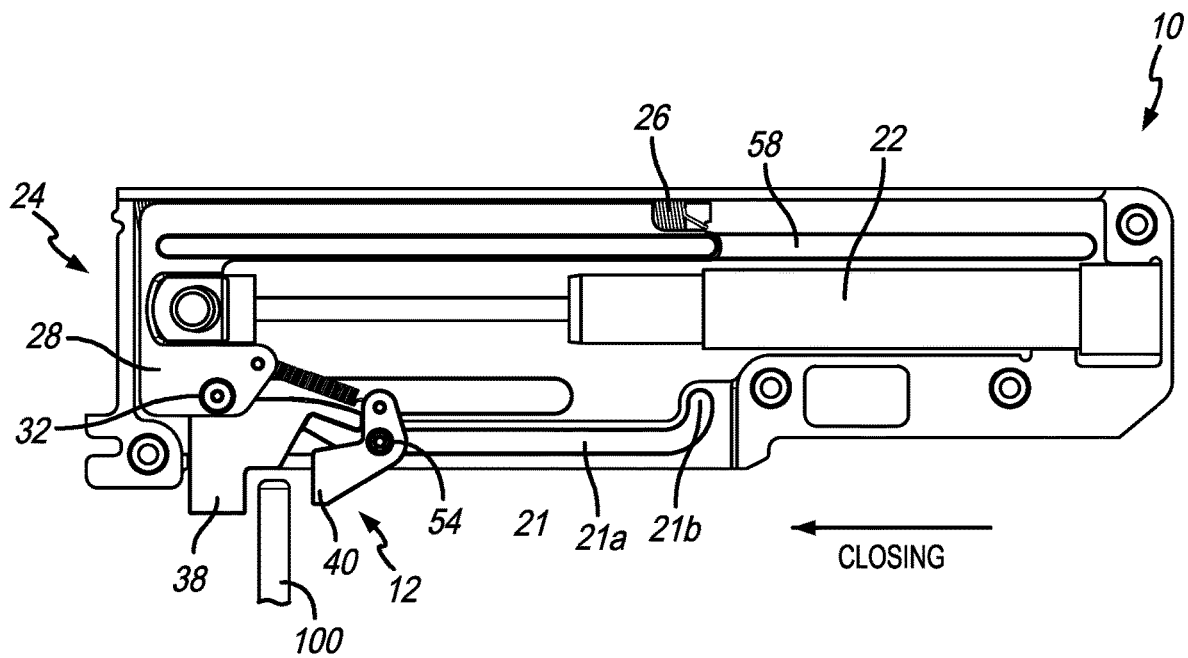
FIG. 10 is a front elevational view of the door damper assembly after the carriage assembly has returned to the closed position and the claw assembly has returned to the toggle position and the door has been closed and damped.

As shown in FIG. 9, when a user begins closing the door, as the roller pin 100 reaches the claw assembly 12 it contacts the pin abutment portion 48 of the first claw member 38. Due to this contact and the force of the door being closed, the claw assembly protrusion 54 is moved out of the second portion 21b of the claw assembly slot 21 and into the first portion 21a. In other words, contact of the pin with the first claw member 38 moves the claw assembly 12 from the toggle position to the non-toggle position. Once this happens, the spring 26, which was in tension, pulls the carriage assembly 24 and claw assembly 12 toward the first position. As this happens, the damper 22 damps the motion of the carriage assembly 24 and claw assembly 12 so that the door does not slam shut. Therefore, the spring 26 helps close the door and the damper 22 prevents the door from slamming. FIG. 10 shows the carriage assembly 24 and claw assembly 12 back in the first position after the door is closed.

Figure 11:
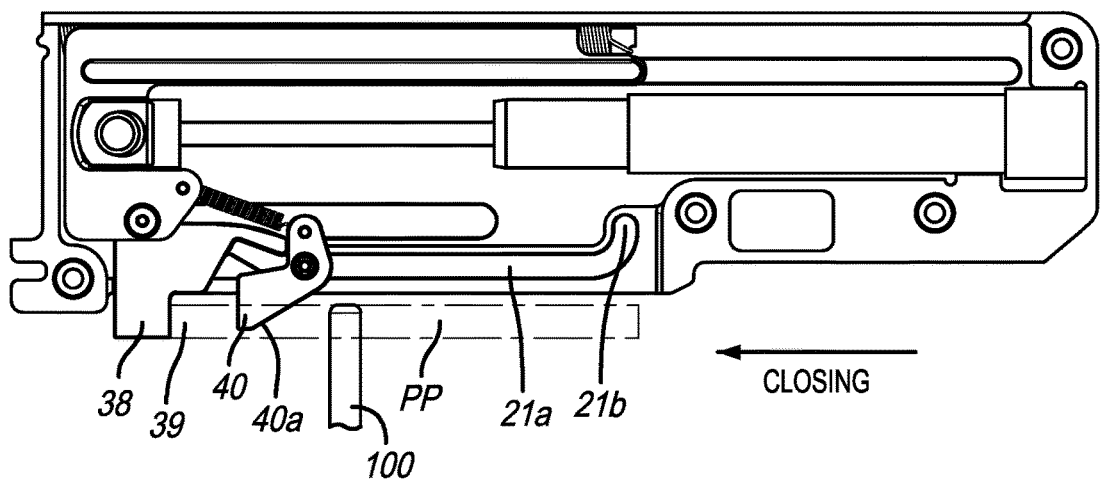
FIG. 11 is a front elevational view of the door damper assembly showing the reset capability with the door pin outside of the pin receiving space and moving toward the closed position.
Figure 12:
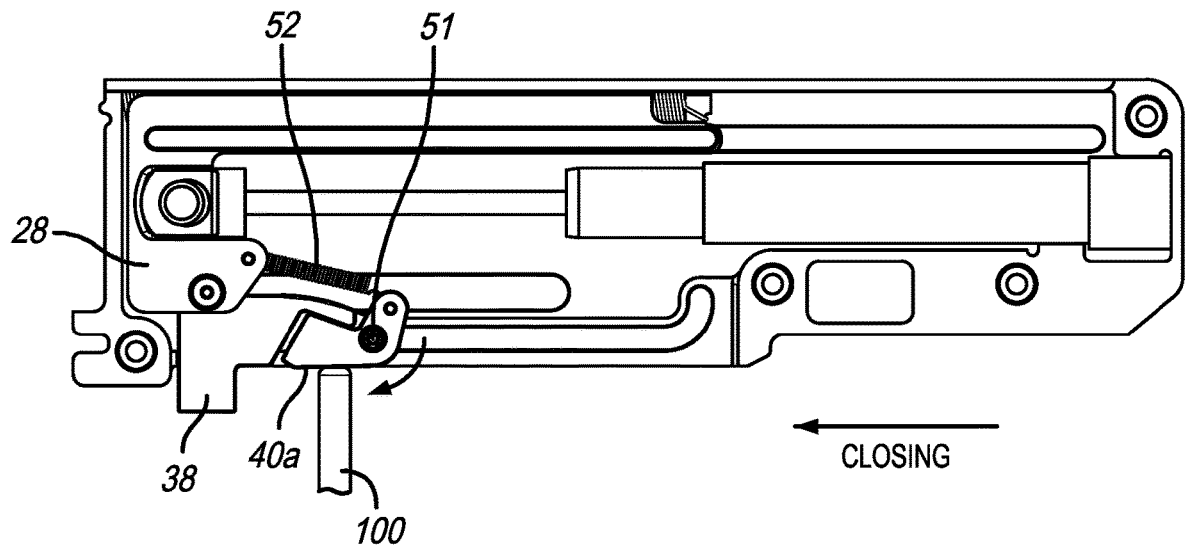
FIG. 12 is a front elevational view of the door damper assembly showing the reset capability where the door pin has moved the second claw member to the second position.
Figure 13:
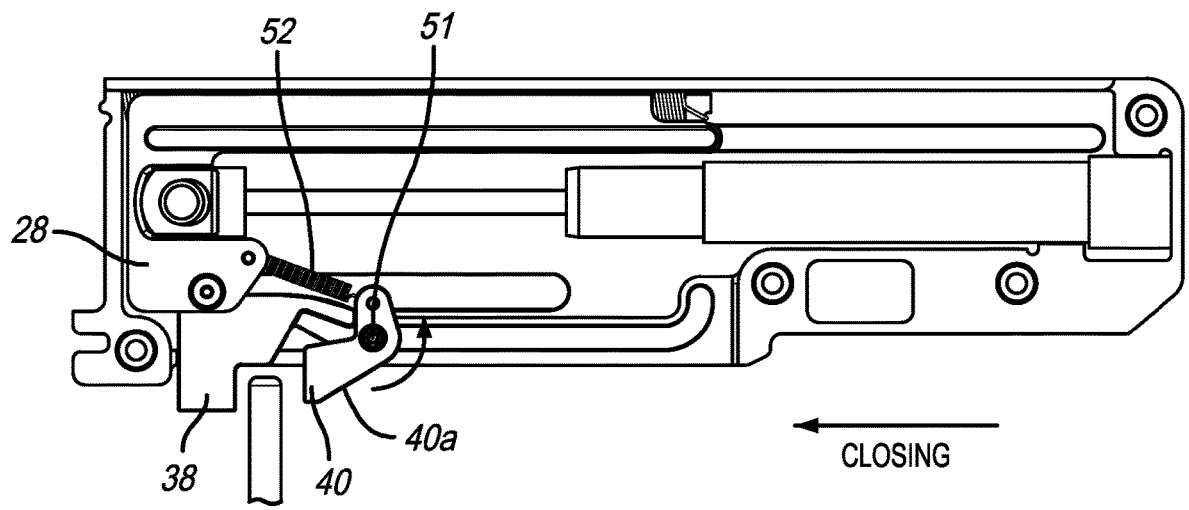
FIG. 13 is a front elevational view of the door damper assembly showing the reset capability where the door pin has moved past the second claw member and back into the pin receiving space.

As discussed above, in a preferred embodiment, the door damper assembly 10 includes a reset feature. This is shown in FIGS. 11-13. FIG. 11 shows a situation where the claw assembly 12 needs to be "reset." In this situation, the roller pin 100 is outside of the pin receiving space 39 when the claw assembly 12 is in the non-toggle position and has returned to the first position, without the roller pin 100. It will be appreciated that when the carriage assembly 24 moves between the closed position and the open position the pin receiving space 39 defines a pin path PP, represented by the two dashed lines in FIG. 11. In the reset situation, the roller pin 100 is outside of the pin receiving space, but still in the pin path.

In this situation, as the door is moved from the open position to the closed position (see FIG. 11), and the pin 100 is moving along the pin path PP, the pin contacts the outer inclined surface 40a of the second claw member 40 and pivots the second claw member 40 from the first position to the second position, as shown in FIG. 12. The curved arrow in FIG. 12 shows the rotation of the second claw member 40 when pivoting to the second position. After the roller pin 100 passes the second claw member 40 and comes out of contact with the outer inclined surface 40a, the claw spring 52 biases or pivots the second claw member 40 back to the first position, as shown in FIG. 13. The curved arrow in FIG. 13 shows the rotation of the second claw member 40 back to the first position. As is shown in FIG. 13, the roller pin 100 is now back within the pin receiving space 39.

It will be appreciated that the carriage assembly protrusions 32, claw assembly protrusions 54 and spring protrusions 56 extend outwardly from both sides of the carriage and claw assemblies and are received in the carriage assembly slots 46, claw assembly slots 21 and spring slots 58 that are defined in the housing 14. However, in another embodiment, only one set of protrusions and associated slots can be used. In another embodiment, the reset feature can be omitted.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A door damper assembly comprising:
a housing,
a damper disposed within the housing, wherein the damper includes a fixed end and a movable end,
a carriage assembly, wherein the movable end of the damper is secured to the carriage assembly, wherein the carriage assembly is movable between a closed position and an open position,
a claw assembly pivotably attached to the carriage assembly, wherein the claw assembly is movable with the carriage assembly between the closed position and the open position, wherein the claw assembly is movable relative to the carriage assembly between a non-toggle position and a toggle position, and wherein the claw assembly includes a pin receiving space defined therein that defines a claw axis that is generally vertical when the claw is in the non-toggle position, and wherein the claw axis is not vertical when the claw assembly is in the toggle position, wherein the claw assembly includes first and second claw members, wherein the second claw member is pivotable with respect to the first claw member, wherein the second claw member is pivotable between a first position and a second position, and wherein the second claw member is biased to the first position, wherein when the carriage assembly moves between the closed position and the open position the pin receiving space defines a pin path, wherein the second claw member includes an outer inclined surface, wherein the second claw member is configured such that when a pin moving along the pin path from an open position to a closed position contacts the outer inclined surface, the second claw member pivots from the first position to the second position, wherein the second claw member is pivotably attached to the first claw by a reset pivot pin, wherein the reset pivot pin is at least partially disposed in a claw assembly protrusion that protrudes from the second claw member, wherein the reset pivot pin and claw assembly protrusion are co-axial, and wherein the claw assembly protrusion is received in a claw assembly slot defined in the housing, and
a spring positioned to bias the carriage assembly to the closed position.

2. The door damper assembly of claim 1 wherein the carriage assembly and the claw assembly move along a carriage path having a first end and a second end as the carriage assembly moves between the closed position and the open position, and wherein the claw assembly pivots to the toggle position at the second end of the carriage path.

3. The door damper assembly of claim 1 wherein the spring has a first end secured to the housing and a second end secured to the carriage assembly.

4. The door damper assembly of claim 3 wherein the carriage assembly defines a spring receiving space therein, and wherein the spring is disposed in the spring receiving space.

5. The door damper assembly of claim 4 wherein the carriage assembly includes a spring protrusion protruding therefrom, wherein the spring protrusion is received in a spring slot defined in the housing, wherein the spring protrusion is positioned proximate the spring, and wherein the spring protrusion moves along the spring slot when the carriage assembly moves between the closed position and the open position.

6. The door damper assembly of claim 1 wherein the claw assembly is pivotably attached to the carriage assembly by a claw pivot pin, wherein the claw pivot pin is at least partially disposed in a carriage assembly protrusion that protrudes from the carriage assembly, wherein the claw pivot pin and carriage assembly protrusion are co-axial, wherein the carriage assembly protrusion is received in a carriage assembly slot defined in the housing, and wherein the carriage assembly protrusion moves along the carriage assembly slot when the carriage assembly moves between the closed position and the open position.

7. A door damper assembly comprising:
a housing,
a damper disposed within the housing, wherein the damper includes a fixed end and a movable end,
a carriage assembly, wherein the movable end of the damper is secured to the carriage assembly, wherein the carriage assembly is movable between a closed position and an open position,
a claw assembly pivotably attached to the carriage assembly, wherein the claw assembly is movable with the carriage assembly between the closed position and the open position, wherein the claw assembly is movable relative to the carriage assembly between a non-toggle position and a toggle position, and wherein the claw assembly includes a pin receiving space defined therein that defines a claw axis that is generally vertical when the claw is in the non-toggle position, and wherein the claw axis is not vertical when the claw assembly is in the toggle position, wherein the claw assembly includes a claw assembly protrusion protruding outwardly therefrom, wherein the claw assembly protrusion is received in a claw assembly slot defined in the housing, wherein the claw assembly slot includes a first portion and a second portion, wherein the first portion of the claw assembly slot is straight and the second portion of the claw assembly slot is curved, wherein the claw assembly protrusion moves along the claw assembly slot when the carriage assembly moves between the closed position and the open position, and wherein the claw assembly moves to the toggle position when the claw assembly protrusion moves through the second portion of the claw assembly slot, and
a spring positioned to bias the carriage assembly to the closed position.

8. The door assembly of claim 1, wherein a claw spring extends between the carriage assembly and the second claw member, wherein the claw spring biases the second claw member to the first position.

9. The door damper assembly of claim 1 wherein the claw assembly extends downwardly through an opening in the housing such that at least a portion of the pin receiving space is located at an exterior of the housing.

10. A door damper assembly comprising:
a housing,
a damper disposed within the housing, wherein the damper includes a fixed end and a movable end,
a carriage assembly that includes a carriage member, wherein the movable end of the damper is secured to the carriage member, wherein the carriage assembly is movable between a closed position and an open position,
a claw assembly pivotably attached to the carriage assembly by a claw pivot pin and movable with respect to the carriage assembly between a toggle position and a non-toggle position, wherein the claw assembly is movable with the carriage assembly between the closed position and the open position, wherein the claw assembly includes a claw assembly protrusion protruding outwardly therefrom, wherein the claw assembly protrusion is received in a claw assembly slot defined in the housing, wherein the claw assembly slot includes a first portion and a second portion, wherein the first portion of the claw assembly slot is straight and the second portion of the claw assembly slot is curved, wherein the claw assembly protrusion moves along the claw assembly slot when the carriage assembly moves between the closed position and the open position, wherein the claw assembly moves to the toggle position when the claw assembly protrusion moves through the second portion of the claw assembly slot, wherein the claw assembly includes a pin receiving space defined therein that defines a claw axis that is generally vertical when the claw is in the non-toggle position, wherein the claw axis is not vertical when the claw assembly is in the toggle position, wherein the claw pivot pin is at least partially disposed in a carriage assembly protrusion that protrudes from the carriage assembly, wherein the claw pivot pin and carriage assembly protrusion are co-axial, wherein the carriage assembly protrusion is received in a carriage assembly slot defined in the housing, and wherein the carriage assembly protrusion moves along the carriage assembly slot when the carriage assembly moves between the closed position and the open position, and a spring positioned to bias the carriage assembly to the closed position, wherein the spring has a first end secured to the housing and a second end secured to the carriage assembly, and wherein the carriage member defines a spring receiving channel therein, and wherein the spring is disposed in the spring receiving channel.

11. The door damper assembly of claim 10 wherein the claw assembly includes first and second claw members, wherein the second claw member is pivotable with respect to the first claw member.

12. The door damper assembly of claim 11 wherein the second claw member is pivotable between a first position and a second position, and wherein the second claw member is biased to the first position.

13. The door damper assembly of claim 12 wherein when the carriage assembly moves between the closed position and the open position the pin receiving space defines a pin path, wherein the second claw member includes an outer inclined surface, wherein the second claw member is configured such that when a pin moving along the pin path from an open position to a closed position contacts the outer inclined surface, the second claw member pivots from the first position to the second position.

14. The door damper assembly of claim 13 wherein the second claw member is pivotably attached to the first claw by a reset pivot pin, wherein the reset pivot pin is at least partially disposed in the claw assembly protrusion, wherein the reset pivot pin and claw assembly protrusion are co-axial, wherein the claw assembly protrusion is received in a claw assembly slot defined in the housing.

15. The door assembly of claim 14, wherein a claw spring extends between the carriage assembly and the second claw member, wherein the claw spring biases the second claw member to the first position.

* * * * *